(12) United States Patent
Hiruta et al.

(10) Patent No.: US 11,135,725 B2
(45) Date of Patent: Oct. 5, 2021

(54) ROBOT CONTROL SYSTEM, ROBOT CONTROL METHOD AND USER APPARATUS FOR ROBOT CONTROL SYSTEM

(71) Applicant: Honda Motor Co., Ltd., Tokyo (JP)

(72) Inventors: Shigenori Hiruta, Wako (JP); Shiro Kitamura, Wako (JP); Daisuke Muramatsu, Tokyo (JP); Shuji Nakayama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 557 days.

(21) Appl. No.: 16/136,051

(22) Filed: Sep. 19, 2018

(65) Prior Publication Data

US 2019/0099895 A1    Apr. 4, 2019

(30) Foreign Application Priority Data

Sep. 29, 2017 (JP) .............................. JP2017-189798

(51) Int. Cl.
*G06F 17/00* (2019.01)
*B25J 13/00* (2006.01)
(Continued)

(52) U.S. Cl.
CPC ........... *B25J 13/006* (2013.01); *B25J 9/0003* (2013.01); *B25J 13/00* (2013.01); *B25J 13/04* (2013.01);
(Continued)

(58) Field of Classification Search
CPC . B25J 13/006; B25J 13/00; B25J 13/04; B25J 9/0003; B25J 13/081; B25J 9/1694;
(Continued)

(56) References Cited

U.S. PATENT DOCUMENTS 9,785,247 B1 * 10/2017 Horowitz .............. G06F 3/0304
2015/0073907 A1 * 3/2015 Purves ................... G06Q 20/32
705/14.58
(Continued)

FOREIGN PATENT DOCUMENTS

JP   2006289565 A   10/2006
JP   2017051350 A   3/2017

*Primary Examiner* — Ronnie M Mancho
(74) *Attorney, Agent, or Firm* — Duft & Bornsen, PC (57) ABSTRACT

A robot control system, including: a mobile robot having a situation-detecting unit detecting surrounding situations; a user apparatus operating in a manner recognizable by a user based on signals detected by the situation-detecting unit; an action-detecting unit detecting a predetermined action of the user; a brain-activity-detecting unit detecting a brain activity of the user; and a robot-controlling unit controlling the robot. The user apparatus has a computing unit analyzing the brain activity of the user detected by the brain-activity-detecting unit to output a first-action instruction from the user to the robot. The robot controlling unit further controlling the robot in accordance with the first-action instruction output by the computing unit and controlling, when the predetermined action is detected by the action-detecting unit during operation of the user apparatus, the robot in accordance with a second-action instruction different from the first-action instruction output by the computing unit.

13 Claims, 6 Drawing Sheets

(51) Int. Cl.
  *G06F 3/01*     (2006.01)
  *B25J 13/04*    (2006.01)
  *B25J 9/00*     (2006.01)
  *B25J 13/08*    (2006.01)
  *B25J 9/16*     (2006.01)

(52) U.S. Cl.
  CPC ............ *B25J 13/081* (2013.01); *G06F 3/015* (2013.01); *B25J 9/1694* (2013.01)

(58) Field of Classification Search
  CPC ........ B25J 9/0006; B25J 9/161; B25J 9/1669; G06F 3/015; G06F 2203/0381; G06F 3/038; G06F 3/011
  USPC ......................................................... 700/245
  See application file for complete search history.

(56) References Cited

U.S. PATENT DOCUMENTS

| | | | | |
|---|---|---|---|---|
| 2015/0190925 A1* | 7/2015 | Hoffman | ................ | B25J 9/1671 700/257 |
| 2016/0320860 A1* | 11/2016 | Josephson | ............ | G06F 3/04845 |
| 2017/0180336 A1* | 6/2017 | Josephson | .......... | G06K 9/00892 |
| 2019/0054631 A1* | 2/2019 | Govindarajan | .......... | B25J 13/08 |
| 2019/0302903 A1* | 10/2019 | Atlas | ..................... | G06F 3/0354 |
| 2020/0289228 A1* | 9/2020 | Denlinger | .............. | A61B 17/29 |

* cited by examiner

ROBOT CONTROL SYSTEM, ROBOT CONTROL METHOD AND USER APPARATUS FOR ROBOT CONTROL SYSTEM

CROSS-REFERENCE TO RELATED APPLICATION

This application is based upon and claims the benefit of priority from Japanese Patent Application No. 2017-189798 filed on Sep. 29, 2017, the content of which is incorporated herein by reference.

BACKGROUND OF THE INVENTION

Field of the Invention

This invention relates to a robot control system, a robot control method and a user apparatus for robot control system.

Description of the Related Art

Apparatuses for controlling actions of a remotely located robot in accordance with instructions from a user are known. Such an apparatus is described, for example, in Japanese Unexamined Patent Publication No. 2006-289565 (JP2006-289565A). The apparatus taught by JP2006-289565A controls actions of a robot based on data representing user brain activity acquired from a brain waveform sensor or the like.

A point of interest here is that a person who suddenly encounters an unexpected situation sometimes acts more appropriately reflexively than consciously by brain judgment. Therefore, in an apparatus like that of JP2006-289565A arranged to control a robot based on data representing user brain activity, the robot may not be able to act appropriately when an unexpected situation is suddenly encountered.

SUMMARY OF THE INVENTION

An aspect of the present invention is a robot control system, including: a mobile robot having a situation detecting unit configured to detect surrounding situations of the robot; a user apparatus configured to operate in a manner recognizable by a user based on signals detected by the situation detecting unit; an action detecting unit configured to detect a predetermined action of the user; a brain activity detecting unit configured to detect a brain activity of the user; and a robot controlling unit configured to control the robot, wherein the user apparatus has a computing unit configured to analyze the brain activity of the user detected by the brain activity detecting unit to output a first action instruction from the user to the robot. The robot controlling unit further configured to control the robot in accordance with the first action instruction output by the computing unit and configured to control, when the predetermined action is detected by the action detecting unit during operation of the user apparatus, the robot in accordance with a second action instruction different from the first action instruction output by the computing unit.

Another aspect of the present invention is a robot control method for controlling a mobile robot having a situation detecting unit configured to detect surrounding situations of the robot, including: detecting a predetermined action of a user; detecting and analyzing a brain activity of the user to output a first action instruction from the user to the robot; and controlling the robot in accordance with the first action instruction. The controlling the robot includes controlling the robot in accordance with a second action instruction different from the first action instruction when the predetermined action is detected while a user apparatus operates in a manner recognizable by the user based on signals detected by the situation detecting unit.

Further aspect of the present invention is a user apparatus for a robot control system configured to operate in a manner recognizable by a user manner based on signals sent from an external robot and indicating surrounding situations of the robot, including: a communicating unit configured to receive the signals indicating the surrounding situations of the robot and configured to send a control signal to the robot; an action detecting unit configured to detect a predetermined action of the user; a brain activity detecting unit configured to detect a brain activity of the user; and a computing unit configured to analyze the brain activity of the user detected by the brain activity detecting unit to output a first action instruction from the user to the robot. The computing unit further configured to output a second action instruction different from the first action instruction output by the computing unit to the communicating unit as the control signal, when the predetermined action is detected by the action detecting unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention is explained below with reference to FIGS. 1 to 7. The robot control system according to this embodiment of the present invention analyzes user brain activity, activates actions of a robot located at a place apart from the user, and offers the user services in a perceptible mode based on signals detected by the robot.

Although the robot can act individually in response to instructions from the user, an example is explained in the following in which the robot acts not individually but also together with third persons such as the user's family. The robot control system of the following example is adapted to deal with a situation in which a user arranges for a robot to join his or her family (or family member) in place of the user when they go out by themselves (on a trip, for example) without the user who cannot join them for some reason and is particularly adapted to provide the user with information obtained by the robot in such a situation. As a result, the user can, for example, enjoy a family outing just as if traveling with family even while staying home.

Figure 1:
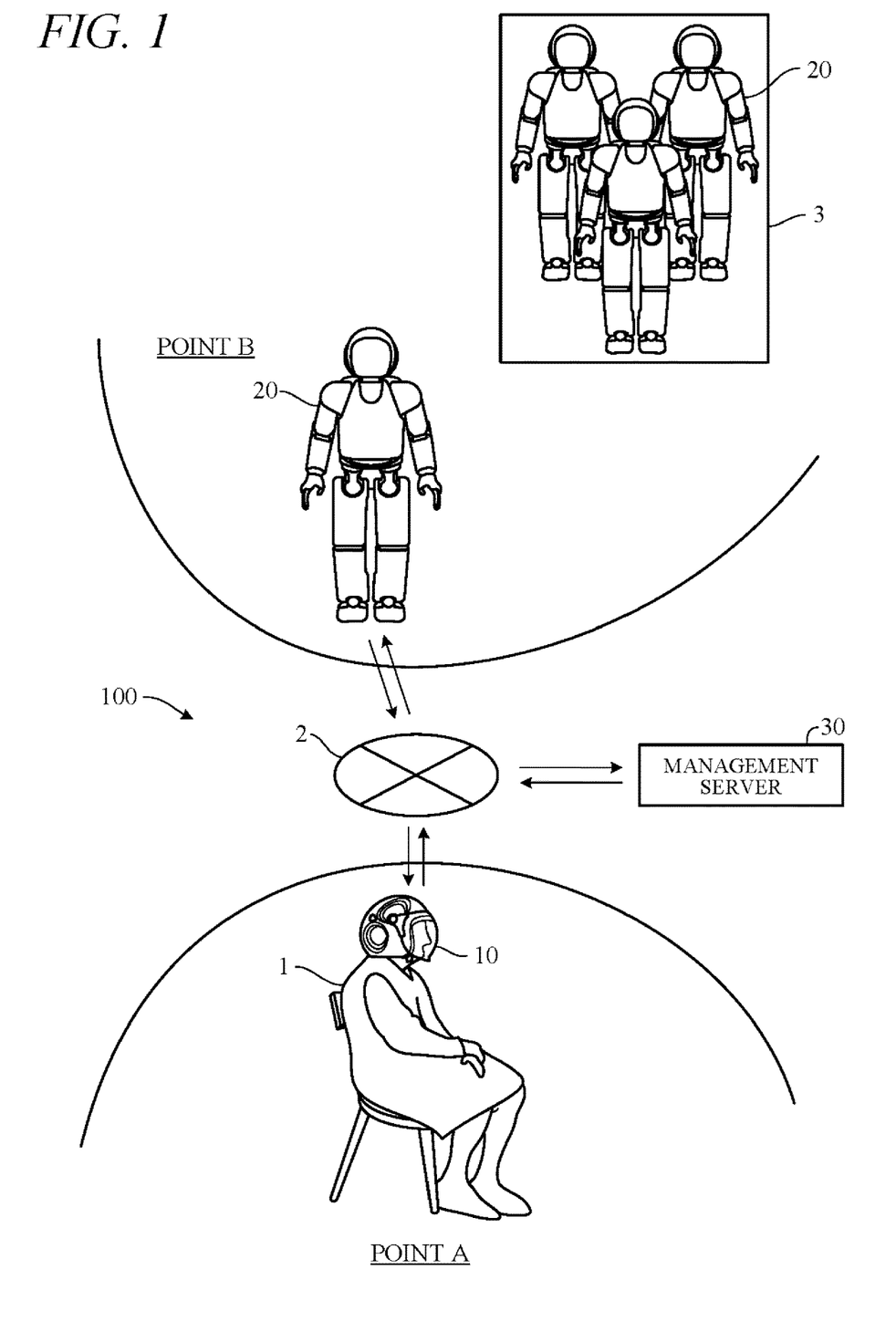
FIG. 1 is a diagram schematically illustrating overall configuration of a robot control system according to an embodiment of the present invention.

FIG. 1 is a diagram schematically illustrating overall configuration of a robot control system 100 according to an embodiment of the present invention. As shown in FIG. 1, the robot control system 100 is configured to comprise user apparatus 10 worn by a user 1 at point A, a robot 20 located at point B and operated by the user 1 at point A, and a management server 30.

The user apparatus 10, robot 20 and management server 30 are communicably interconnected by a network 2 including internet lines or other wireless communication network connection. Point A is, for example, the home of the user 1 and point B is a place remote from point A and can be located in another region. Point A and point B can even be in different countries.

The robot 20 at point B is rented at a shop 3 at or near point B. In other words, the robot 20 is rented from the shop 3 visited by the family of the user 1 and participates in the user's family's activities at point B. The family of user 1 returns the robot 20 to the shop 3 after finishing their trip activities at point B. Each robot 20 available from the shop 3 has its own pre-assigned ID.

Figure 2:
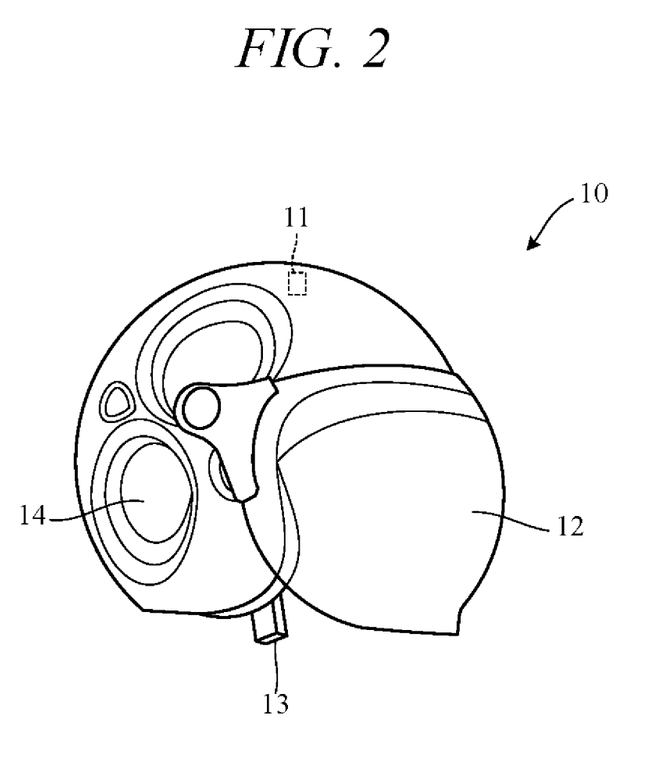
FIG. 2 is a diagram showing a configuration of the user apparatus of FIG. 1.

FIG. 2 is a diagram showing a configuration of the user apparatus 10. As shown in FIG. 2, the user apparatus 10 is a wearable computer shaped overall like a helmet, for example, and is worn on the user's head. The user apparatus 10 is provided with multiple sensors (brain activity detectors 11) for detecting brain activity (brain activity signals) of the user including, inter alia, brain wave sensors for detecting user brain waves or magnetoencephalographic waves, and brain blood flow state. Namely, the user apparatus 10 is equipped with a so-called brain-machine interface (BMI) that detects user thoughts and intentions from brain activity signals and achieves mechanical operations without using body motions.

In addition, the user apparatus 10 has a display 12, microphone 13, and speakers 14. The display 12 is, for example, a nontransparent head-mounted display positioned to surround both of the user's eyes and displays camera images taken by the robot 20. The microphone 13 is movably directed toward the user's mouth and receives voice signals produced by user utterances. The speakers 14 are located near the user's ears and produce voice output.

Figure 3:
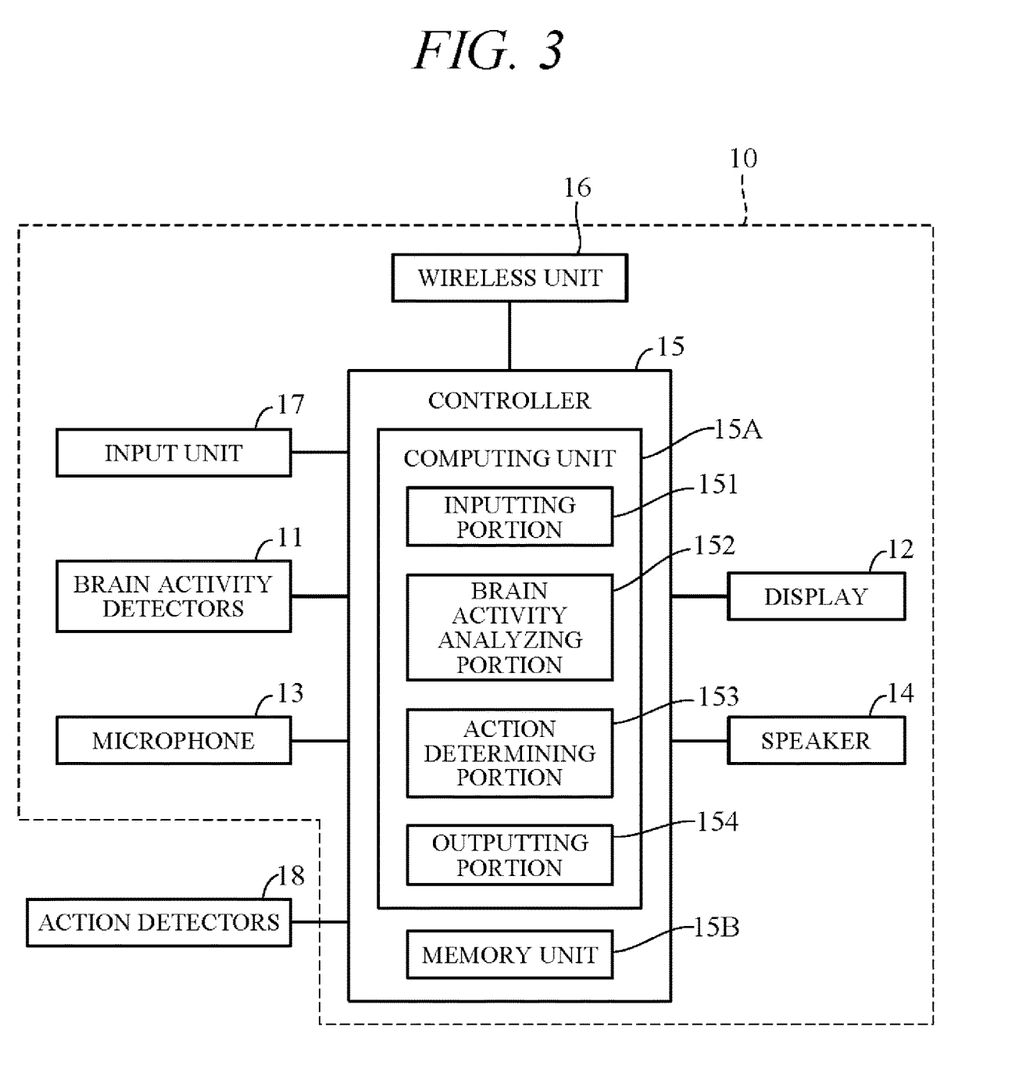
FIG. 3 is a block diagram showing a configuration of the user apparatus of FIG. 1 and peripheral apparatuses thereof.

FIG. 3 is a block diagram showing the configuration of the user apparatus 10 and peripheral apparatuses thereof. As shown in FIG. 3, the aforesaid brain activity detectors 11, display 12, microphone 13 and speakers 14 are wire or wirelessly connected to a controller 15. A wireless unit 16, input unit 17, and action detectors 18 are additionally connected to the controller 15 by wired or wireless connection.

The brain activity detectors 11, display 12, microphone 13, speakers 14, controller 15, wireless unit 16 and input unit 17 are, for example, built into the user apparatus 10. The input unit 17 is configured to comprise switches and a touch panel or the like operated by the user. Various data including user personal data and the like are input through the input unit 17.

Figure 4:
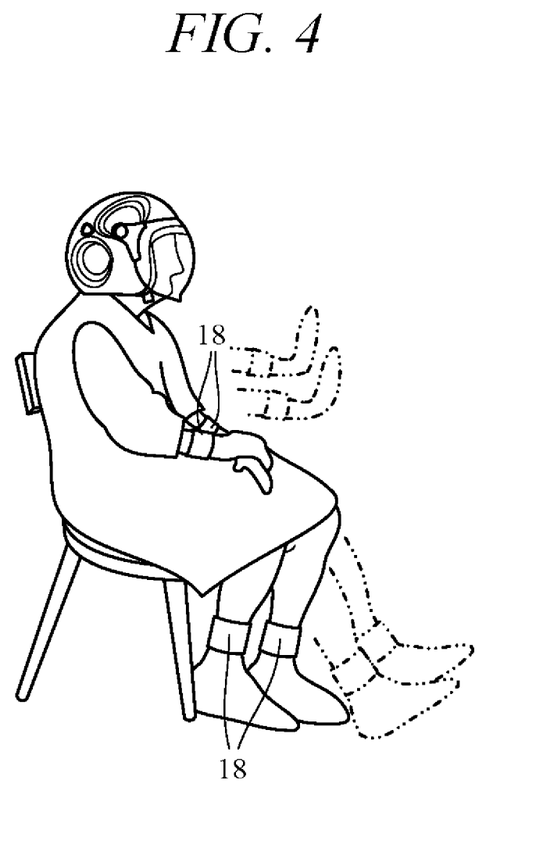
FIG. 4 is a diagram showing an example of how action detectors of FIG. 3 are worn.

The action detectors 18 are worn on the user's body. FIG. 4 is a diagram showing an example of how the action detectors 18 are worn. In the example of FIG. 4, the action detectors 18 are shown to be worn on the arms and legs of the user. The action detectors 18 can instead be worn at other parts of the body insofar as they are at least worn at parts that move reflexively when the wearer suddenly encounters an unexpected situation, i.e., at parts that move unconsciously independently of brain judgment. Suddenly arising situations that cause reflexive reactions are ones like the sudden appearance of a thing or person before one's eyes or sudden emergence of something that makes one likely to stumble or fall. The action detectors 18 comprise, inter alia, acceleration sensors for detecting acceleration, muscle potential sensors for detecting muscle electrical potential, and bend sensors for detecting joint angle. Presence/absence of reflex motion can be determined from signals produced by the action detectors 18.

As shown in FIG. 3, the controller 15 includes a microcomputer comprising a CPU or other computing unit 15A, a memory unit 15B equipped with ROM, RAM and the like, and other peripheral circuits. The controller 15 controls the wireless unit 16 and communicates with the management server 30. In response to instructions from the controller 15, the management server 30 is sent robot 20 action instructions based on signals from the brain activity detectors 11, microphone 13, action detectors 18, and so on. In addition, the controller 15 sends the display 12 and speakers 14 control signals based on signals received from the management server 30.

Figure 5:
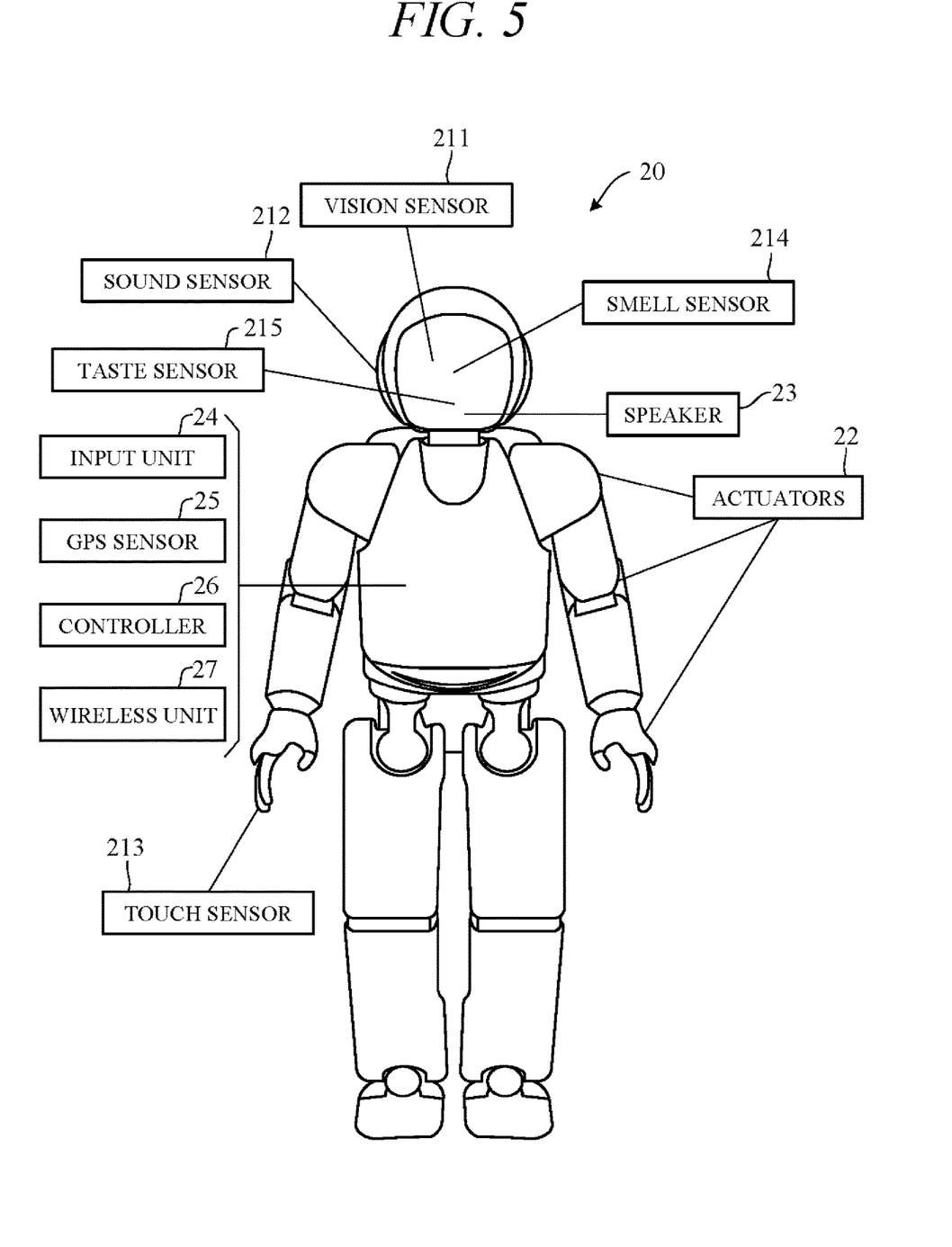
FIG. 5 is a diagram showing structure of a robot of FIG. 1.

FIG. 5 is a diagram showing structure of the robot 20. As shown in FIG. 5, the robot 20 is a humanoid robot having a head, trunk, two arms and two legs, and is capable of autonomous movement by biped walking. The robot 20 is nearly as tall as a human adult, with a height of around 140 to 160 cm, for example.

The robot 20 is equipped with multiple sensors possessing detection capabilities corresponding to the "five senses" traditionally recognized as sensing capabilities enabling humans to perceive the external world, namely, with at least one each of a vision sensor 211, sound sensor 212, touch sensor 213, smell sensor 214, and taste sensor 215. The sensors 211 to 215 output signals corresponding to the human five senses (five sense signals) as detection signals.

The vision sensor 211 comprises a camera having an imaging unit comprising a CMOS sensor, CCD sensor or other image sensor located at an eye position of the robot 20 and a lens, a drive unit for driving the imaging unit vertically and laterally, and a zoom mechanism for enlarging and shrinking subject images. The vision sensors 211 take images (video images) around the robot 20. The sound sensor 212 comprises a microphone located, for example, at an ear position of the robot 20. The sound sensors 212 pick up sounds around the robot 20. The touch sensor 213 comprises a force sensor located, for example, at a hand position of the robot 20. The touch sensors 213 detect external force acting on the hands of the robot 20. The smell sensor 214 is located at a nose position of the robot 20 and detects smells. The taste sensor 215 is located at a mouth position of the robot 20 and detects tastes.

The robot 20 additionally comprises at least one each of an actuator 22, speaker 23, input unit 24, GPS sensor 25, controller 26, and wireless unit 27. The actuators 22 include multiple motors or the like provided, for example, at associated joints of the robot 20. Robot 20 actions are implemented by driving the actuators 22. The speaker 23 is located at the mouth position of the robot 20 and produces voice output. The input unit 24 is equipped with a power switch and various other switches. The GPS sensor 25 receives GPS signals from GPS satellites. Position of the robot 20 can be detected using signals from the GPS sensor 25.

The controller 26 includes a microcomputer comprising a CPU, ROM, RAM and the like. The controller 26 controls the wireless unit 27 and communicates with the management server 30. For example, the controller 26 sends the five sense signals output by the sensors 211 to 215 and the signals from the GPS sensor 25 to the management server 30. In addition, the controller 26 sends control signals to the actuators 22, speaker 23 and so on based on signals received from the management server 30.

Figure 6:
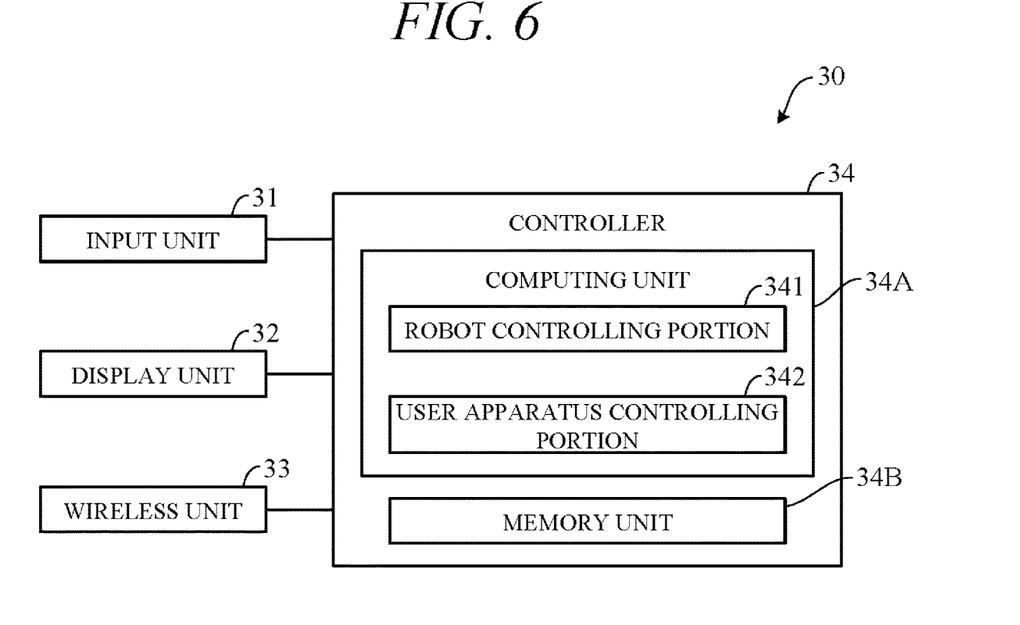
FIG. 6 is a block diagram showing configuration overview of a management server of FIG. 1.

FIG. 6 is a block diagram showing an example configuration overview of the management server 30. As shown in FIG. 6, the management server 30 comprises an input unit 31, display unit 32, wireless unit 33 and controller 34. Optionally, the input unit 31 and display unit 32 can be omitted.

The controller 34 comprises a CPU or other computing unit 34A, a memory unit 34B equipped with ROM, RAM, hard disk and the like, and other peripheral circuits. The controller 34 controls the wireless unit 33 and communicates with the user apparatus 10 and the robot 20. The computing unit 34A comprises a robot controlling portion 341 and a user apparatus controlling portion 342 as functional constituents.

The robot controlling portion 341 generates actuation signals for the actuators 22 of the robot 20 based on robot 20 action instructions received from the user apparatus 10, i.e., based on action instructions resulting from user brain activity. These action signals are then sent through the wireless unit 33 to the robot 20. In response to these actuation signals, the controller 26 of the robot 20 outputs control signals to the actuators 22. As a result, the robot 20 can be made to act on behalf of the user 1 in accordance with intention of the user 1. The robot controlling portion 341 can also use signals from the microphone 13 of the user apparatus 10 to reproduce the user's voice through the speaker 23 of the robot 20.

The user apparatus controlling portion 342 generates action signals for the user apparatus 10 based on signals (five sense signals) from the sensors 211 to 215 of the robot 20. These actions signals are then transmitted through the wireless unit 33 to the user apparatus 10. For example, picture signals based on signals detected by the vision sensors 211 are transmitted. In response to these picture signals, the controller 15 of the user apparatus 10 outputs control signals to the display 12 to display 3D pictures obtained from the vision sensors 211 on the display 12. The user apparatus controlling portion 342 can also use signals from the sound sensors 212 to reproduce voices through the speakers 14 of the user apparatus 10.

In the so-configured robot control system 100, when the robot 20 encounters a sudden unexpected situation in the course of acting in response to instructions from the user 1, the situation concerned is picked up by the vision sensors 211 and displayed on the display 12. If at such time, the user 1 should produce a brain activity signal that results in the robot 20 being instructed to act to avoid the sudden incident (to perform an avoidance action), the action of the robot 20 in accordance with this instruction would not be a robot 20 reflex action and performance of an avoidance action by the robot 20 would be delayed. In the present embodiment, the robot control system 100 is configured as set out in the following in order to prevent such action delays by the robot 20.

As shown in FIG. 3, the computing unit 15A of the controller 15 of the user apparatus 10 has as functional constituents an inputting portion 151, a brain activity analyzing portion 152, an action determining portion 153, and an outputting portion 154.

The inputting portion 151 receives signals from the sensors 211 to 215 of the robot 20 through the wireless unit 16 and signals directly from the brain activity detectors 11, microphone 13, input unit 17 and the action detectors 18.

The brain activity analyzing portion 152 uses signals of the brain activity detectors 11 input to the inputting portion 151 to analyze brain activity of the user 1 and specify action instructions of the user 1 to the robot 20. The specified action instructions are sent through the wireless unit 16 to the management server 30, and actions of the robot 20 are controlled based thereon. Optionally, the wireless unit 16 can be configured for not only wireless but also wired communication connection.

The action determining portion 153 determines whether actions of the user 1 detected by the action detectors 18 are reflex actions. Since the user 1 sees pictures acquired by the robot 20 displayed on the display 12 in real time, the user 1 tends to identify with the robot 20. Therefore, when the robot 20 encounters a sudden unexpected situation, the user 1 reflexively reacts in response to the situation. For example, as indicated by double-dot chain lines in FIG. 4, the user 1 reflexively reacts in certain ways without any brain judgment on the part of the user 1, such as by thrusting out arms or jerking legs forward. The action determining portion 153 uses signals from the action detectors 18 to determine whether the user 1 had such a reflex action. Specifically, presence/absence of a reflex action is determined by determining whether detection value, change in detection value or detection value change per unit time of one or more action detectors 18, e.g. one or more acceleration sensors and/or muscle potential sensors, reached or exceeded a predetermined value.

The outputting portion 154 outputs different action instructions to the robot 20 depending on the result of determination by the action determining portion 153. Specifically, when the action determining portion 153 determines that an action of the user 1 is not a reflex action, the outputting portion 154 outputs an action instruction in accordance with the user 1 brain activity determined by brain activity analyzing portion 152 analysis (first action instruction). On the hand, when the action determining portion 153 determines that an action of the user 1 is a reflex action, the outputting portion 154 outputs an urgent action instruction stored in the memory unit 15B in advance (second action instruction). In either case, the output action instruction is transmitted through the wireless unit 16 to the management server 30, whereby the robot 20 is controlled in accordance with the transmitted action instruction.

The second action instruction is an instruction for prompting the robot 20 to act in response to a sudden unexpected situation. Examples of second action instructions include, inter alia, an instruction to immediately halt walking activity of the robot 20, an instruction to move the robot 20 backwards, and an instruction to move the arms or legs of the robot 20 in a certain manner. When a reflex action of the user 1 is detected, the outputting portion 154 outputs a second action instruction matched to detected behavior of the user 1 selected from among multiple second action instructions stored in the memory unit 15B in advance. Optionally, a configuration can be adopted that responds to detection of a reflex action of the user 1 by outputting a certain predetermined second action instruction regardless of how the user 1 reacted.

Figure 7:
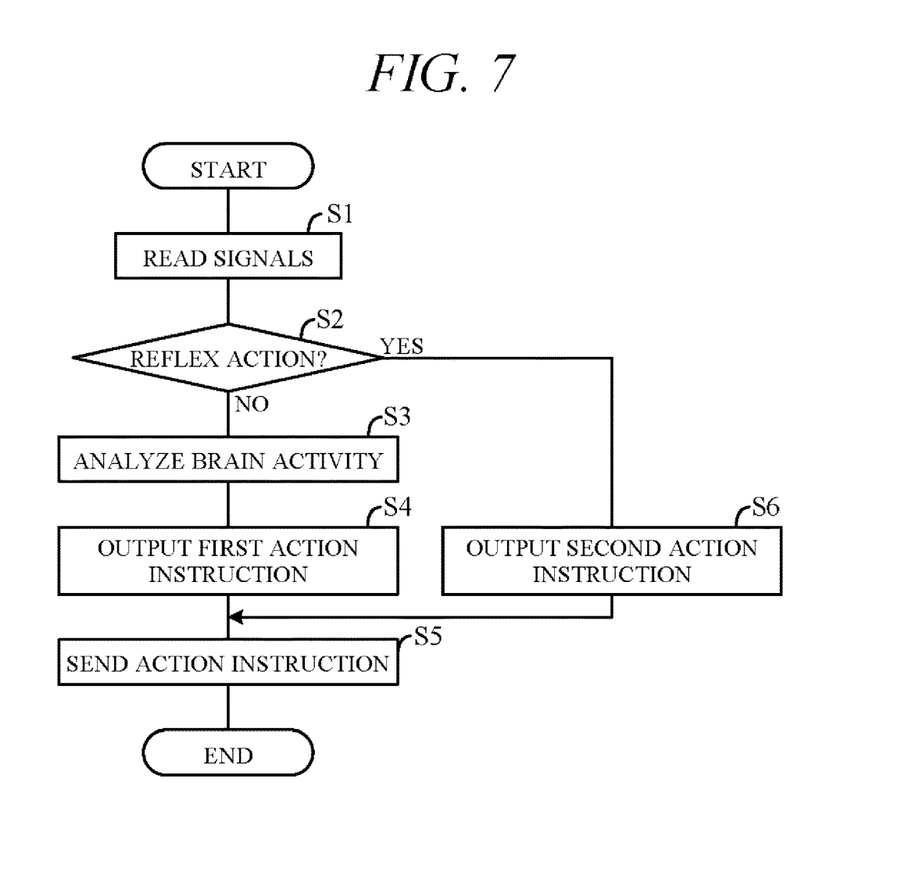
FIG. 7 is a flowchart showing an example of processing performed by a computing unit of FIG. 6.

FIG. 7 is a flowchart showing processing performed by the computing unit 15A of the user apparatus 10 in accordance with a program stored in the memory unit 15B in advance, particularly processing related to output of action instructions to the robot 20. The processing represented by this flowchart is, for example, commenced upon input to the robot 20 from the user apparatus 10 of an instruction to activate the robot 20 and is repeated at predetermined intervals.

First, in S1 (S: processing Step), signals are read from the brain activity detectors 11 and the action detectors 18. Next, in S2, the action determining portion 153 determines based on the signals from the action detectors 18 whether action of the user 1 is reflex action. When the result in S2 is NO, the program goes to S3, in which the brain activity analyzing portion 152 analyzes brain activity of the user 1 based on signals from the brain activity detectors 11 and specifies an action instruction from the user 1 to the robot 20.

Next, in S4, the outputting portion 154 outputs a first action instruction based on the analysis result in S3, whereafter, in S5, the output first action instruction is sent to the management server 30. As a result, the robot 20 acts in accordance with the brain activity-derived instruction of the user 1. Pictures picked up by the vision sensors 211 of the robot 20 at this time are displayed on the display 12.

On the other hand, when the action of the user 1 is determined in S2 to be reflex action, the program goes to S6. In S6, the outputting portion 154 selects from the memory unit 15B a second action instruction matched to the reaction of the user 1 and outputs the selected second action instruction. Next, in S5, the output second action instruction is sent to the management server 30. As a result, the robot 20 acts without receiving a user 1 brain-derived instruction. Since the robot 20 can therefore instantaneously take appropriate action, just like a reflex action, in response to the sudden unexpected situation, it can suitably respond to the sudden incident.

The present embodiment can achieve advantages and effects such as the following:

(1) The robot control system 100 according to the present embodiment includes: the mobile robot 20 having the various sensors 211 to 215 for detecting surrounding circumstances; the user apparatus 10 that operates in a manner perceivable by the user 1 based on signals detected by the sensors 211 to 215 (e.g., the vision sensors 211); the action detectors 18 for detecting predetermined reflex actions of the user 1; the brain activity detectors 11 for detecting brain activity of the user 1; the computing unit 15A (outputting portion 154) for analyzing brain activity detected by the brain activity detectors 11 and outputting first action instructions from the user 1 to the robot 20; and the robot controlling portion 341 and controller 26 for controlling the robot 20 in accordance with first action instruction output by the computing unit 15A (FIGS. 3 and 5). When the user apparatus 10 is operating based on signals from the vision sensors 211, the robot controlling portion 341 etc. are responsive to detection of a predetermined reflex action by the action detectors 18 for controlling the robot 20 in accordance with a second action instruction, distinct from a first action instruction, output from the computing unit 15A (FIG. 7).

Thus when a predetermined reflex action of the user 1 is detected, the robot 20 is controlled in accordance with a second action instruction distinct from a user 1 brain activity-derived first action instruction, so that it can always be made to act in an appropriate manner. In other words, the robot control system 100 adapted to control the robot 20 using brain activity-derived instructions is further adapted to control the robot 20 using instructions not derived from brain activity when the robot 20 encounters a sudden unexpected situation. As a result, the robot 20 can be prompted to act in response to sudden unexpected situations in a suitable manner without delay.

(2) When a predetermined reflex action of the user 1 is detected by the action detectors 18, the computing unit 15A selects a second action instruction matched to the detected action from the memory unit 15B, whereupon the robot controlling portion 341 etc. control the robot 20 in accordance with the selected second action instruction. Since the second action instruction can therefore be decided in accordance with the unexpected situation suddenly encountered by the robot 20, the robot 20 can be very suitably controlled. For example, the robot 20 can be prompted to perform arm and leg actions like those of the user 1.

(3) The robot 20 has the vision sensors 211 (cameras) for detecting its surroundings, and the user apparatus 10 has the display 12 for displaying pictures picked up by the vision sensors 211 (FIGS. 2 and 5). The user 1 can therefore easily perceive circumstances around the robot 20 in real time.

(4) The action detectors 18 can comprise sensors for detecting movements of predetermined parts of the body of the user 1. In such case, the robot controlling portion 341 etc. respond to detection by the action detectors 18 of movement of a predetermined body part by a predetermined amount (value) or greater by controlling the robot 20 in accordance with a second action instruction distinct from a first action instruction. Since reflex movements of the user 1 can therefore be accurately detected, the robot 20 can be appropriately controlled in accordance with reflex movements.

(5) The action detectors 18 can be sensors that detect acceleration of predetermined parts of the user's body. In such case, the robot controlling portion 341 etc. respond to detection by the action detectors 18 of acceleration of a predetermined body part by a predetermined value or greater by controlling the robot 20 in accordance with a second action instruction distinct from a first action instruction. Since this also enables accurate detection of reflex movements of the user 1, the robot 20 can be appropriately controlled in accordance with reflex movements.

(6) The robot control method according to an embodiment of the present invention, namely, the robot control method for controlling the mobile robot 20 having the various sensors 211 to 215 for detecting surrounding circumstances, comprises: detecting a predetermined action of the user 1; detecting and analyzing brain activity of the user 1 and outputting a first action instruction from the user 1 to the robot 20; and controlling the robot 20 in accordance with the output action instruction. Control of the robot 20 as termed here includes controlling the robot 20 in accordance with a second action instruction distinct from a first action instruction when a predetermined reflex action is detected while the user apparatus 10 is operating in a manner perceivable by the user 1 based on signals detected by the sensors 211 to 215. The robot 20 can therefore be prompted to act in an appropriate manner without delay even when the robot 20 encounters some sudden unexpected situation. That is to say, the robot 20 can take appropriate reflex-like action.

(7) The user apparatus 10 for the robot control system according to the embodiment of the present invention operates in a manner perceivable to the user 1 based on signals indicating circumstances around the robot 20 transmitted from the remotely located robot 20. This user apparatus 10 receives signals representing circumstances around the robot 20, and comprises the wireless unit 16 as the communication unit for transmitting control signals to the robot 20, the action detectors 18 for detecting predetermined actions of the user 1, the brain activity detectors 11 for detecting brain activity of the user 1, and the computing unit 15A (outputting portion 154) for analyzing brain activity of the user 1 detected by the brain activity detectors 11 and outputting first action instructions to the robot 20 (FIG. 3). When the action detectors 18 detect a predetermined action, the computing unit 15A outputs to the wireless unit 16 as a control signal a second action instruction distinct from the first action instruction output by the computing unit 15A. Owing to the configuration of the user apparatus 10 in this manner, the robot 20 can be prompted to take appropriate action with respect to sudden incidents without delay.

Various modifications of the aforesaid embodiment are possible. Some examples are explained in the following. In the aforesaid embodiment, circumstances around the robot 20 are detected by the sensors 211 to 215 corresponding to the five human senses, but a situation detecting unit is not limited to this configuration. Although the aforesaid embodiment uses the humanoid robot 20 capable of autonomous movement by biped walking, a robot that acts in response to instructions received from the user 1 by wireless communication is not limited to the aforesaid configuration.

In the aforesaid embodiment, the brain activity detectors 11 detect brain activity of the user 1, the brain activity analyzing portion 152 analyzes the detected brain activity and the outputting portion 154 outputs a first action instruction from the user 1 to the robot 20, but a computing unit is not limited to this configuration. In the aforesaid embodiment, the robot controlling portion 341 transmits action signals to the robot 20 in accordance with action instructions instructed by the outputting portion 154 (first action instructions/second action instructions) and controller 26 controls the robot 20 based on these control signals, but a robot controlling unit (robot controlling portion 341 and controller 26) is not limited to the aforesaid configuration.

In the aforesaid embodiment, a head-mounted display having the display 12 as the display unit is used in the user apparatus 10, but the user apparatus can be of any type insofar as it operates based on signals detected by the sensors 211 to 215 and other situation detecting units in a manner perceivable by the user 1. The aforesaid embodiment is adapted to detect reflex actions of the user 1 using the action detectors 18 worn on the arms, legs or other parts of the user's body, but an action detecting unit is not limited to the aforesaid configuration. For example, predetermined actions of the user 1 can be detected using cameras. Detection of fingertip reflex movements is another option.

The aforesaid embodiment is adapted to output a second action instruction instead of a first action instruction in case of a predetermined action of the user 1 being detected by the action detectors 18 when pictures acquired by the robot 20 are being displayed on the display 12 of the user apparatus 10, i.e., during operation of the user apparatus 10. However, the fact of the user apparatus being in operation as a precondition for outputting such a second action instruction is not limited to the case of pictures being displayed on the display 12. In other words, the precondition is met no matter how the user apparatus is in operation insofar as the equipment is operating in a condition that enables the user to tell whether the robot encountered a sudden unexpected situation.

In the aforesaid embodiment, some functions of the controllers 15 and 26 of the user apparatus 10 and robot 20 can be assumed by the management server 30, and some functions of the management server 30 can be assumed by the controllers 15 and 26. In the aforesaid embodiment, the management server 30 exchanges signals with the user apparatus 10 and the robot 20. In other words, the user apparatus 10 and the robot 20 are adapted to communicate with each other through the management server 30. However, the user apparatus 10 and the robot 20 can be adapted to communicate directly rather than through the management server 30. In such case, functions of the management server 30 are preferably assumed by the controllers 15 and 26 of the user apparatus 10 and robot 20.

Although the robot 20 is rented from the shop 3 in the aforesaid embodiment, the present invention can be identically configured using a robot owned by the user 1 and usually kept at home. Optionally, the robot 20 can be made to engage in activities alone rather than participate in family activities. Also possible is to enable the management server 30 to communicate with a terminal of the shop 3 so that the management server 30 can be used, for example, to reserve robots and pay rental fees.

The above embodiment can be combined as desired with one or more of the above modifications. The modifications can also be combined with one another.

According to the present invention, the robot can take appropriate reflex-like action even when the robot encountered a sudden unexpected situation.

Above, while the present invention has been described with reference to the preferred embodiments thereof, it will be understood, by those skilled in the art, that various changes and modifications may be made thereto without departing from the scope of the appended claims.

What is claimed is:

1. A robot control system, comprising:
   a mobile robot having a situation detecting unit configured to detect surrounding situations of the robot;
   a user apparatus configured to operate in a manner recognizable by a user based on signals detected by the situation detecting unit;
   an action detecting unit configured to detect a magnitude of motion or an acceleration of a predetermined part of a body of the user that moves reflexively;
   a brain activity detecting unit configured to detect a brain activity of the user; and
   a robot controlling unit configured to control the robot, wherein
   the user apparatus has a computing unit configured to analyze the brain activity of the user detected by the brain activity detecting unit to output a first action instruction from the user to the robot, wherein
   the robot controlling unit is further configured to control the robot in accordance with the first action instruction output by the computing unit when the magnitude of motion or the acceleration of the predetermined part detected by the action detecting unit during operation of the user apparatus is smaller than a predetermined value, and configured to control the robot in accordance with a second action instruction different from the first action instruction output by the computing unit when the magnitude of motion or the acceleration of the predetermined part detected by the action detecting unit during operation of the user apparatus is equal to or greater than the predetermined value.

2. The robot control system according to claim 1, wherein the situation detecting unit has a camera, wherein the user apparatus has a display configured to display images acquired by the camera.

3. The robot control system according to claim 1, wherein the action detecting unit detects the magnitude of motion of the predetermined part, wherein the robot controlling unit controls the robot in accordance with the second action instruction when the magnitude of motion of the predetermined part detected by the action detecting unit is equal to or greater than the predetermined value.

4. The robot control system according to claim 1, wherein the action detecting unit detects the acceleration of the predetermined part, wherein
the robot controlling unit controls the robot in accordance with the second action instruction when the acceleration of the predetermined part detected by the action detecting unit is equal to or greater than the predetermined value.

5. The robot control system according to claim 1, further comprising:
a management server communicably interconnected with each of the robot and the user apparatus, wherein
the management server has the robot controlling unit.

6. A robot control method for controlling a mobile robot having a situation detecting unit configured to detect surrounding situations of the robot, comprising:
operating a user apparatus in a manner recognizable by a user based on signals detected by the situation detecting unit;
detecting a magnitude of motion or an acceleration of a predetermined part of a body of the user that moves reflexively;
detecting and analyzing a brain activity of the user to output a first action instruction from the user to the robot;
controlling the robot in accordance with the first action instruction when the magnitude of motion or the acceleration of the predetermined part detected during operation of the user apparatus is smaller than a predetermined value; and
controlling the robot in accordance with a second action instruction different from the first action instruction when the magnitude of motion or the acceleration of the predetermined part detected during operation of the user apparatus is equal to or greater than the predetermined value.

7. A user apparatus for a robot control system configured to operate in a manner recognizable by a user based on signals sent from an external robot and indicating surrounding situations of the robot, comprising:
a communicating unit configured to receive the signals indicating the surrounding situations of the robot and configured to send a control signal to the robot;
an action detecting unit configured to detect a magnitude of motion or an acceleration of a predetermined part of a body of the user that moves reflexively;
a brain activity detecting unit configured to detect a brain activity of the user; and
a computing unit configured to analyze the brain activity of the user detected by the brain activity detecting unit to output a first action instruction from the user to the robot
when the magnitude of motion or the acceleration of the predetermined part detected by the action detecting unit is smaller than a predetermined value, and configured to output a second action instruction different from the first action instruction output by the computing unit to the communicating unit as the control signal when the magnitude of motion or the acceleration of the predetermined part detected by the action detecting unit is equal to or greater than the predetermined.

8. The user apparatus for a robot control system according to claim 7, further comprising:
a display configured to display images indicating the surrounding situations of the robot.

9. The user apparatus for a robot control system according to claim 7, wherein
the action detecting unit detects the magnitude of motion of the predetermined part, wherein
the computing unit outputs the second action instruction to the communicating unit when the magnitude of motion of the predetermined part detected by the action detecting unit is equal to or greater than the predetermined value.

10. The user apparatus for a robot control system according to claim 7, wherein
the action detecting unit detects the acceleration of the predetermined part, wherein
the computing unit outputs the second action instruction to the communicating unit when the acceleration of the predetermined part detected by the action detecting unit is equal to or greater than the predetermined value.

11. The robot control system according to claim 1, wherein
the predetermined part moves reflexively when the user encounters a sudden unexpected situation.

12. The robot control system according to claim 1, wherein
the second action instruction is an instruction for prompting the robot to act in response to a sudden unexpected situation.

13. The robot control system according to claim 1, wherein
the robot controlling unit controls the robot in accordance with the second action instruction without receiving the first action instruction output by the computing unit when the magnitude of motion or the acceleration of the predetermined part detected by the action detecting unit is equal to or greater than the predetermined value.

* * * * *